United States Patent [19]

Tokumitsu

[11] 4,432,022
[45] Feb. 14, 1984

[54] ORIGINAL READING APPARATUS

[75] Inventor: Jun Tokumitsu, Tokyo, Japan

[73] Assignee: Canon Kabushiki Kaisha, Tokyo, Japan

[21] Appl. No.: 250,263

[22] Filed: Apr. 2, 1981

[30] Foreign Application Priority Data

Apr. 14, 1980 [JP] Japan .................................. 55-48916
May 15, 1980 [JP] Japan .................................. 55-64445

[51] Int. Cl.³ .............................................. H04N 1/02
[52] U.S. Cl. .................................... 358/293; 358/213; 358/250
[58] Field of Search ................ 350/167; 358/294, 250, 358/285, 213, 293

[56] References Cited

U.S. PATENT DOCUMENTS 4,154,506  5/1979  Yevick ................................ 350/167
4,314,159  2/1982  Davis ................................ 358/293
4,352,128  9/1982  Ohori et al. ........................ 358/293

Primary Examiner—John C. Martin
Assistant Examiner—Edward L. Coles
Attorney, Agent, or Firm—Fitzpatrick, Cella, Harper & Scinto

[57] ABSTRACT

There is provided an original reading apparatus comprising a table for supporting thereon an original to be read, the photosensor for receiving a light beam from said original and an ommateal optical system. The optical system images the light beam from the original on the photosensor. The optical system has a plastic lens block in which a plurality of lenses are formed integral with one another. The plastic lens block is divided into an effective lens portion having the function of condensing the light beam and a lens protecting portion for protecting the effective lens portion. The distance between the outer end surface of the lens protecting portion and the effective lens portion is equal to or greater than one-half of the thickness of the effective lens portion.

3 Claims, 7 Drawing Figures

ORIGINAL READING APPARATUS

BACKGROUND OF THE INVENTION

1. Field of the Invention

This invention relates to an original reading apparatus such as a facsimile or the like.

2. Description of the Prior Art

In recent years, compact original reading apparatus comprising solid sensors and a minute lens array have been developed in the field of facsimile. Examples of such reading apparatus are shown in FIGS. 1 and 2 of the accompanying drawings. FIG. 1 is a schematic view of a reading apparatus using solid sensors and a one-layer lens array. In FIG. 1, reference numeral 1 designates an original placed on an original supporting table, not shown, reference numeral 2 denotes minute lenses, and reference numeral 3 designates solid sensors such as CCD or photodiode arrays. The original 1 is conveyed in a direction perpendicular to the plane of the drawing sheet and partial inverted images of the original are formed on the sensors 3 by the individual minute lenses 2. The arrangement direction of the solid sensors 3 corresponds to the line of one main scanning direction of the original 1, and the outputs from the solid sensors are rearranged in the order of the image element rows of the original, whereby reading of one line of the original is effected.

FIG. 2 is a schematic view of another example using a solid sensor and a minute lens array. In FIG. 2, reference numerals 4 and 6 designate imaging lenses and reference numeral 5 denotes field lenses. Reference numeral 7 designates a one-dimensional long solid line sensor. The original 1 is conveyed in a direction perpendicular to the plane of the drawing sheet and erect images of various portions of the original formed by the lenses 4, 5 and 6 are connected, whereby a complete image of one line is formed on the sensor 7. In this example, unlike the example shown in FIG. 1, the image of the original is an erect image and therefore, if the bit outputs of the sensor 7 are successively taken out, they provide signals of one line of the original 1 in that order.

The plural solid sensors 3 in the example of FIG. 1 or the solid sensor 7 in the example of FIG. 2 is arranged over a length equal to the width of the original 1 and the length of the light path of each individual minute lens may be short and therefore, the reading apparatus is very compact.

However, such a minute lens array, as compared with a single lens, is difficult to prepare. This is because, in order to accurately maintain the relative positions of the minute lenses, for example a lens array comprising a plurality of minute lenses arranged on the same base (which is not always formed of a single material) must be formed.

As the material of the lenses used in such an optical system, plastic is desirable because of its low cost and ease of manufacture. However, plastic has its properties readily variable for variations in environmental conditions and particularly has a great absorbing characteristic which leads to a fatal drawback that any variation in humidity would cause entry of moisture from the peripheral portion of the lenses which in turn would result in variation in refractive index. Thus, the individual lenses themselves have refractive index distributions and further, in an ommateal system, the lenses differ in refractive index from one another depending on the positions at which they are arranged, whereby the imaging performances of the lenses fluctuate to preclude stable reading of an original. Such disadvantage of plastic has made it difficult to put into practical use a reading apparatus using a plastic lens array.

SUMMARY OF THE INVENTION

It is an object of the present invention to provide a reading apparatus which is compact in construction as well as inexpensive and easy to manufacture and which maintains a stable optical performance.

It is a further object of the present invention to provide an original reading apparatus which can provide an irregularity-free uniform output over an entire original to be read.

The invention will become fully apparent from the following detailed description taken in conjunction with the accompanying drawings.

DESCRIPTION OF THE PREFERRED EMBODIMENTS

Figure 3:
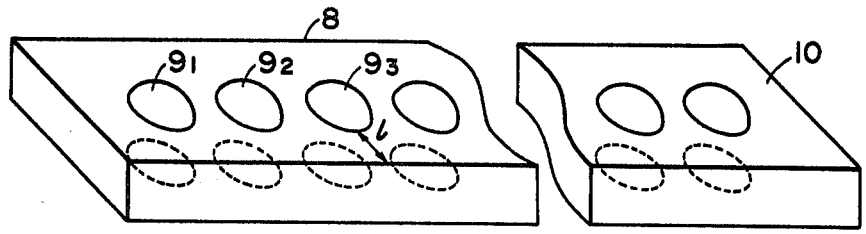
FIG. 3 shows an embodiment of the present invention.

FIG. 3 is a schematic view showing an embodiment of the present invention. In this embodiment, a minute lens array 8 is formed of a unitary block. The material of this block may suitably be polymethyl-methacrylate (PMMA) or the like. This optical system is formed with effective plastic lens portions $9_1, 9_2, \ldots$ which actually contribute to reading and is provided with a protective portion 10 around each effective lens portion, the portions 9 and 10 being formed integrally with one another. The protective portion 10 is formed so that the length thereof from the peripheral end of each effective lens portion to the end surface of the block is equal to or greater than a predetermined length. Thus, in the minute lens array optical system of the present embodiment, even if more or less moisture enters thereinto from its surrounding end surfaces, the moisture is kept away from the effective lens portions, which are thus hardly effected by the moisture. The lens surface of each lens which has a curvature is directly exposed to the atmosphere and permits moisture to readily enter therefrom. However, it is known that it is when entry of moisture from a direction perpendicular to the optical axis of the lens causes the refractive index of the lens to have a distribution in this direction that entry of moisture varies the refractive index and thereby imparts a most serious influence to the imaging performance, and entry of moisture from the direction of the optical axis offers very little problem.

Suitably, the minimum value 1 of the distance from the outer end surface of the protective portion of the lens block to the effective lens portion which contributes to the imaging for reading should desirably be equal to or greater than ½ of the thickness of the lens in most of the lens portion groups, and particularly in the entire range of the lens portion groups. The reason is that in an optical system which satisfies such a condition, even if moisture enters from the surroundings of the optical system into the effective lens portions, moisture will have already entered into the effective lens portions to the ½ thickness from the lens surfaces on the opposite sides of the lens by that time and accordingly, the effective lens portions will be uniformly filled with moisture and there will not occur the refractive index distribution in the direction perpendicular to the optical axis which is most deleterious to the imaging performance.

In fact, from an experiment carried out on a lens array manufactured using PMMA and with 4 mm for the lens thickness, 2.5 mm for the diameter of each effective lens portion and 3 mm for the minimum value 1 of the distance from the end surface of the protective portion of the lens block to the effective lens portion, it has been confirmed that even if humidity is varied, the imaging performance of such lens array deteriorates very little and such lens has a sufficient performance for practical use.

Figure 1:
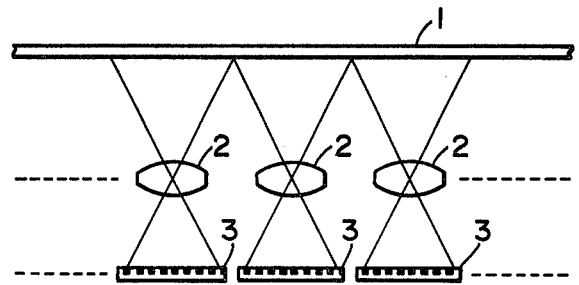
FIG. 1 is a schematic view of a prior art reading apparatus using solid sensors and a single-layer lens array.
Figure 4:
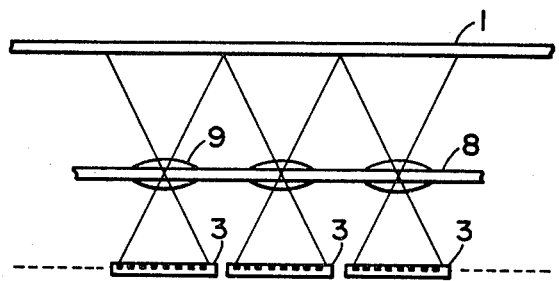
FIG. 4 is a schematic view of a reading apparatus incorporating therein a lens block according to the present invention.

FIG. 4 is a schematic view of a reading apparatus incorporating therein the block-formed lens array optical system according to the present invention. Operation of this reading apparatus is similar to what has been described in connection with the example of FIG. 1.

Figure 2:
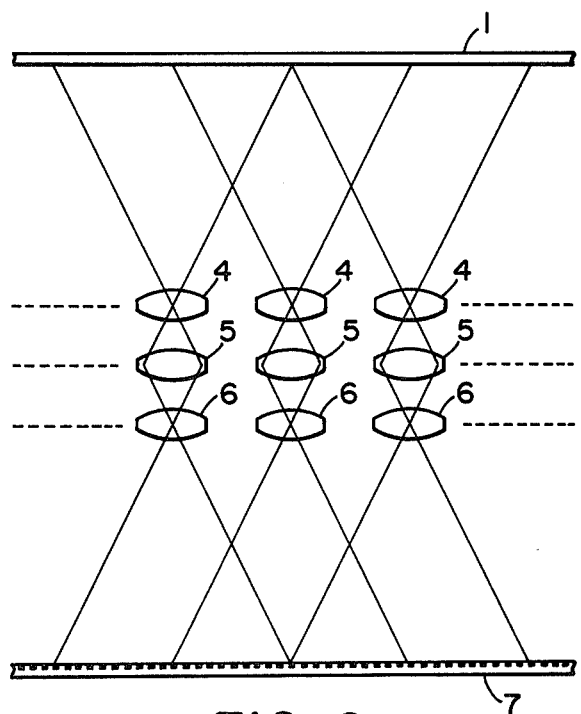
FIG. 2 is a schematic view of a prior art reading apparatus using a solid sensor and a three-layer lens array.
Figure 5:
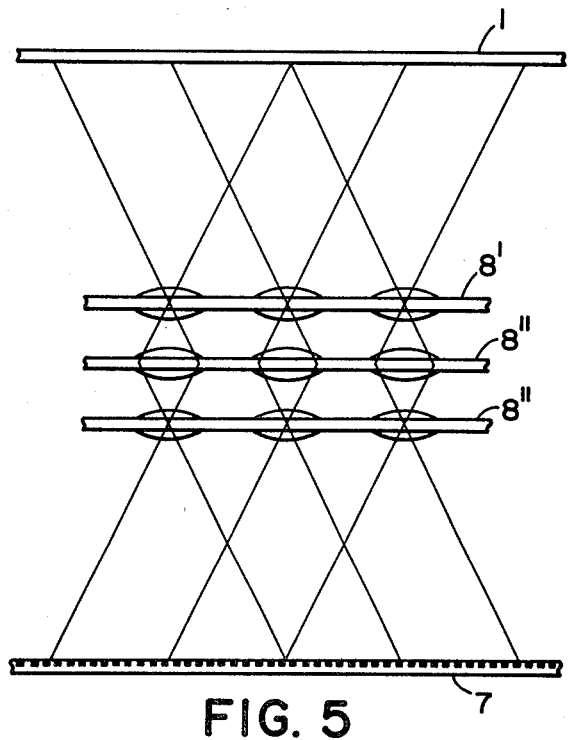
FIG. 5 is a schematic view of another embodiment of the reading apparatus incorporating therein a lens block according to the present invention.

FIG. 5 is a schematic view of another embodiment of the reading apparatus incorporating therein the block-formed lens array according to the present invention. Operation of this reading apparatus is similar to what has been described in connection with the example of FIG. 2.

The embodiment has been described with respect to a case where the lenses are arranged in a row and with a length equal to the width of the original and are made into one block, but in a case where arranging the lenses in a staggered relationship is more convenient, it is possible to arrange the lenses in a plurality of rows and make them integral with one another. Plastic is expanded or contracted by temperature or humidity and in a case where the amount of expansion of contraction is too great if the entire lens array is made into one block, the lens array may be divided into a plurality of blocks. In this latter case where the lens array is divided into a plurality of blocks, as compared with the case where the lens array is made into one block, there will be involved the step of accurately arranging the plurality of blocks, but making a plurality of blocks will result in a better yield and greater ease.

Also, in the reading apparatus of the present invention wherein light-intercepting means for preventing irregularity of reading is provided between adjacent sensors, the imaging magnification $\beta$ of each lens system forming an ommateal optical system should desirably satisfy $\beta \leq 0.8$.

Figure 6:
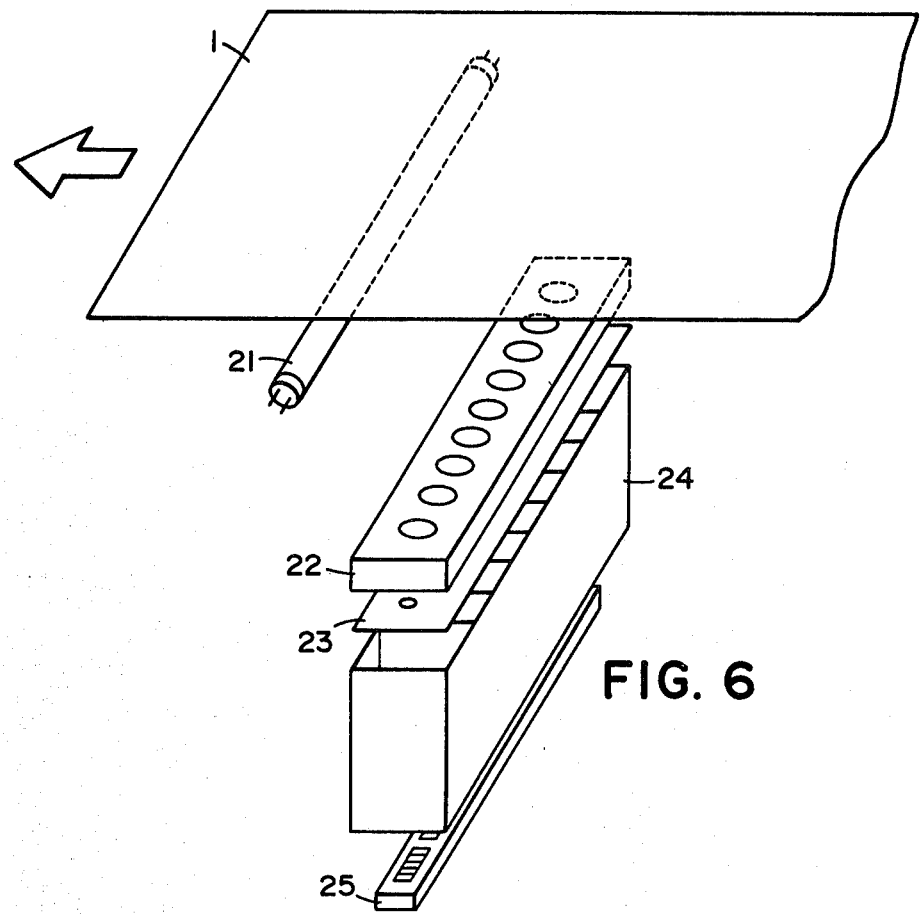
FIG. 6 is a perspective view of still another embodiment of the reading apparatus according to the present invention.
Figure 7:
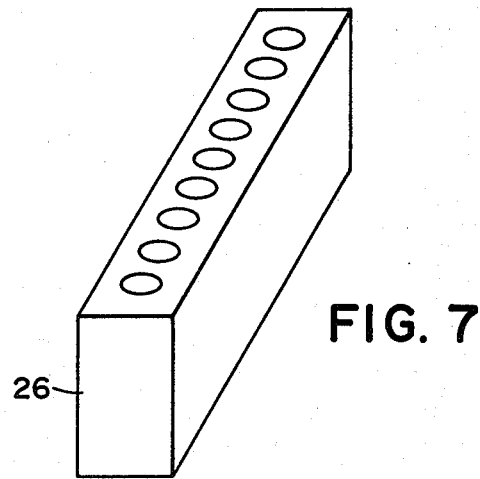
FIG. 7 shows an example of light-intercepting means applied to the reading apparatus shown in FIG. 6.

FIG. 6 is a perspective view of an embodiment of the reading apparatus according to the present invention. Designated by 21 is a fluorescent lamp for illuminating an original and this lamp may be replaced by light-emitting diodes arranged to successively emit light. Denoted by 22 is a lens array comprising a plurality of single lenses. The lens array 22 has been unitarily molded using a plasic such as PMMA (polymethyl-methacrylate). Alternatively, the individual lenses may be formed of glass or plastic and arranged in a desired array. Reference numeral 23 designates a diaphragm plate, and reference numeral 24 denotes a light-intercepting plate which comprises an aluminum plate plated with black. The light-intercepting means may alternatively be an opaque plastic mold 26 formed with apertures corresponding in number to the lenses, as shown in FIG. 7. Designated by 25 is a solid sensor such as CCD or a photodiode array. The solid sensor 25 is divided into several bits corresponding to the individual lenses of the lens array 22.

A very compact original reading apparatus could be constructed which has the focal length of the lens equal to 10 mm, a reduction magnification of 0.75 and a distance of 45 mm between the original and the solid sensor.

In the conventional method wherein the entire original is covered by a lens, the angle of view has been great and the value of the reduction magnification $\beta$ has been small and therefore, to effect necessary aberration correction, the number of lenses had to be plural, whereas if the imaging optical system is made into an ommateal one having a certain number of lenses, the angle of view for each individual lens will be small and the value of the reduction magnification $\beta$ will be relatively great and thus, the conditions for aberration correction will be greatly alleviated. Therefore, it will be possible to make individual lenses into signal lenses.

According to the present invention, as described above, there is provided a compact reading apparatus which makes the most of the advantages of plastic which is strong against fluctuations of environmental conditions such as humidity and yet inexpensive and easy to produce. Also, by rendering the imaging magnification of the imaging optical system to 0.8 or less, the individual lenses are required to image on the solid sensor only a portion of the original in the main scanning direction and it becomes possible to make small the distance between the original and the solid sensor with the angle of view maintained at a small value. Also, in spite of the lenses being arranged over the width of the original, stray light is prevented from being produced by the light-intercepting means and thus, any portion of the original may be read in substantially similar conditions and the output may become irregularity-free or uniform.

What I claim is:

1. An original reading apparatus comprising:
   support means for supporting thereon an original to be read;
   light-receiving means for receiving a light beam from said original; and
   ommateal imaging means for forming the image of said original on said light-receiving means, said ommateal imaging means having a plastic lens block in which a plurality of lenses are formed integrally with one another, said plastic lens block being divided into an effective lens portion having the function of condensing the light beam and a lens protecting portion for protecting said effective lens portion and having an outer end surface, the distance between the outer end surface of said lens protecting portion and said effective lens portion being equal to or greater than ½ of the thickness of said effective lens portion so that when moisture enters said imaging means through said effective lens portion, moisture entering simultaneously from the outer end surface of said lens protecting portion cannot reach said effective lens portion.

2. An original reading apparatus comprising:

an original supporting table for supporting thereon an original to be read;

a photosensor for receiving a light beam from said original; and an ommateal optical system for imaging the light beam from said original on said photosensor, said ommateal optical system having a plastic lens block in which a plurality of lenses are formed integrally with one another, said plastic lens block being divided into an effective lens portion having the function of condensing the light beam and a lens protecting portion for protecting said effective lens portion and having an outer end surface, the distance between the outer end surface of said lens protecting portion and said effective lens portion being sufficient such that when moisture enters said system through said effective lens portion, moisture entering simultaneously from the outer end surface of said lens protecting portion cannot reach said effective lens portion.

3. An original reading apparatus comprising:

an original supporting table for supporting thereon an original to be read;

a photosensor for receiving a light beam from said original;

an ommateal optical system for imaging the light beam from said original on said photosensor, said ommateal optical system having a plastic lens block in which a plurality of lenses are formed integrally with one another, each of said lenses having a magnification of 0.8 or less; and a light intercepting means for substantially separating the imaging light beam from each of said plurality of lenses.

* * * * *